United States Patent [19]

Egert

[11] Patent Number: 5,518,368

[45] Date of Patent: May 21, 1996

[54] TURBINE WHEEL HAVING AN INTEGRALLY MOLDED OUTER SHELL AND BLADE INSERT

[75] Inventor: Dieter Egert, Korb, Germany

[73] Assignee: Robert Bosch GmbH, Stuttgart, Germany

[21] Appl. No.: 301,627

[22] Filed: Sep. 7, 1994

[30]     Foreign Application Priority Data

Oct. 26, 1993 [DE] Germany .......................... 43 36 386.5

[51] Int. Cl.⁶ .................................................... F01D 5/22
[52] U.S. Cl. ...................... 416/180; 416/197 C
[58] Field of Search ................. 416/180, 197 C

[56]                References Cited

U.S. PATENT DOCUMENTS 2,115,895   5/1938   Weihmann ............................. 416/180
3,673,659   7/1972   Ishii et al. .............................. 416/180
4,260,330   4/1981   Frotschner et al. ..................... 416/180
5,037,272   8/1991   By ........................................ 416/180
5,113,654   5/1992   Sshashi ................................. 416/180
5,147,181   9/1992   Klemen ................................. 416/180
5,226,807   7/1993   By et al. ................................ 416/180

OTHER PUBLICATIONS

Dubbel: "Taschenbuch für Maschinenbau" [Handbook of Mechanical Engineering], vol. 14, pp. 904 et seq.

Primary Examiner—John T. Kwon
Attorney, Agent, or Firm—Spencer & Frank

[57]                ABSTRACT

A turbine wheel and a method of manufacturing the same for a hydrodynamic transformer, having an injection molded outer shell, and an integrally formed injection molded blade insert. The blade insert includes one of a hub element and an inner ring, and a plurality of blades. The injection molded blade insert is received within the injection molded outer shell.

20 Claims, 5 Drawing Sheets

TURBINE WHEEL HAVING AN INTEGRALLY MOLDED OUTER SHELL AND BLADE INSERT

CROSS-REFERENCE TO RELATED APPLICATIONS

This application claims the priority of application Serial No. P 43 36 386.5, filed in Germany on Oct. 26, 1993, the disclosure of which is incorporated herein by reference.

BACKGROUND OF THE INVENTION

The present invention relates to a pump wheel and/or turbine for a hydrodynamic transformer. The turbine and/or pump wheel each comprises an outer shell, an inner ring and a plurality of blades. Such transformers, also known as Föttinger speed transformers (Dubbel: "Taschenbuch füur Maschinenbau" [Handbook of Mechanical Engineering], vol. 14, pp. 904 et seq.), are preferably used for the transfer of hydrodynamic output, that is, the transfer of a torque from a driving pump wheel to a turbine wheel using a circulating, output-transferring fluid (typically oil).

The known turbine and pump wheels (hereinafter referred to as turbine wheels) typically comprise deep-drawn and bent sheet metal elements having a shell and blade structure. Turbine wheels comprised of sheet metal typically require an elaborate construction of individual sheet metal pieces connected together, by inserting a sheet metal tongue of one piece into a corresponding recess in another sheet metal piece, and subsequently bending the tongue over. However, these connections disturb the evenness of the inner and outer surfaces of the turbine wheel in an area of the flowing fluid. Further, the fluid can leak at the penetration point of the sheet metal tongue into the corresponding recess, thus resulting in flow losses and reduced efficiency. Alternatively, the individual sheet metal elements may be welded together.

Turbine wheels comprised of plastic are also known, wherein a hollow chamber of the turbine wheel is formed using a core which is subsequently melted out. Alternatively, the individually produced plastic elements are bonded by ultrasound. Turbine wheels made of plastic are considerably lighter than turbine wheels made of metal. Therefore, plastic turbine wheels have a reduced moment of inertia.

SUMMARY OF THE INVENTION

It is an object of the present invention to develop a turbine wheel having only two main structural elements (i.e., a blade insert and an outer shell) to produce or assemble.

It is a further object of the invention to distribute the functional components, for example the blades, inner ring and hub elements, onto the main structural components so that each main structural component can be produced by an injection molding process.

The above and other objects are accomplished according to the invention by the provision of injection molding the blade insert and outer shell of the turbine wheel. The blade insert includes the blades and inner ring of the turbine wheel. When the turbine wheel is assembled, the blade insert is received within the outer shell.

The present invention considerably reduces the production costs compared to the known core melting process. Further, as long as a plastic can be injection molded, any type of thermoplastic or thermosetting plastic can be used as either structural element, without considering the bonding characteristics of the individual plastics.

According to the invention, the blade insert and the outer shell can each have a hub element. Preferably, the hub element of the outer shell can receive a connecting piece for transferring the torque to the outside of the torque wheel. The connecting piece can be injected as an integral component of the hub element, or alternatively, can comprise a separate component for insertion at a later time.

Preferably, the hub elements are threaded so that when assembled, the blade insert is screwed onto the outer shell. Thus, the force acting on the blades when the turbine wheel is operating tightens the screw connection. Therefore, the blade insert and outer shell are easily assembled, and will withstand any increased demands during operation.

Preferably, the outer shell is provided with projections and/or recesses for supporting of the blades. Because of the thread, the force acting on the blades presses the blades against the outer shell as well as against the projections and/or recesses, thus resulting in a more solid structure. Typically, the thread is a coarse thread having the same pitch as the blades.

When assembled using the aforementioned configuration, the blade insert and the outer shell are easily connected together using a sheet metal strip that encloses both parts at their circumference. As previously mentioned, since the forces occurring under a load tend to press the outer shell and the blade insert together, no increased demands are made on the sheet metal strip.

Because the essential main elements of the turbine wheel are made by injection molding, the turbine wheel is manufactured in a cost-effective manner. For example, thermoplastic or thermosetting plastics can be used as the material. Further, the conventional turbine wheels had the individual injection-molded parts, such as individual blades, bonded together by ultrasound, which typically requires the usage of a thermoplastic. However, since the blades of the present invention are integrally formed as part of the blade insert, thermosetting plastics may additionally be used, which can withstand considerably higher temperatures. Additionally, if the turbine wheels are to be subjected to high loads, the individual components can comprise a die-castable metal, such as aluminum or aluminum alloys.

According to the invention, to manufacture the turbine wheel, the turbine wheel's inner ring and blades are integrally combined into a first injection-molded part to form a blade insert, and are injected in one process step. The injection molding tool includes slides or ejectors to create undercuts, thus forming the blades. The blade insert (which has undercuts because of the obliquely placed blades) can be removed from the mold by rotating the blade insert relative to the injection-molding tool. The outer shell is likewise injection-molded, and connected with the blade insert. Thus, in spite of the fact that the blade insert has considerable undercutting, the turbine wheel can be produced in a cost-effective manner having only two main components. Therefore, the present invention's turbine wheel can be produced without using the otherwise necessary (and expensive) core melting technique. Further, there is no need to weld many small, individual parts together, or to connect the parts using the tongue and recess techniques. Additionally, there are no higher demands placed on the injection-molding tool than are customary.

Further, if the blade insert and the outer shell are threaded together, the production process is further simplified since assembly occurs by simply screwing the two parts together.

The invention will be described below in greater detail in connection with embodiments thereof that are illustrated in the drawing figures.

DETAILED DESCRIPTION OF THE INVENTION

Figure 1:
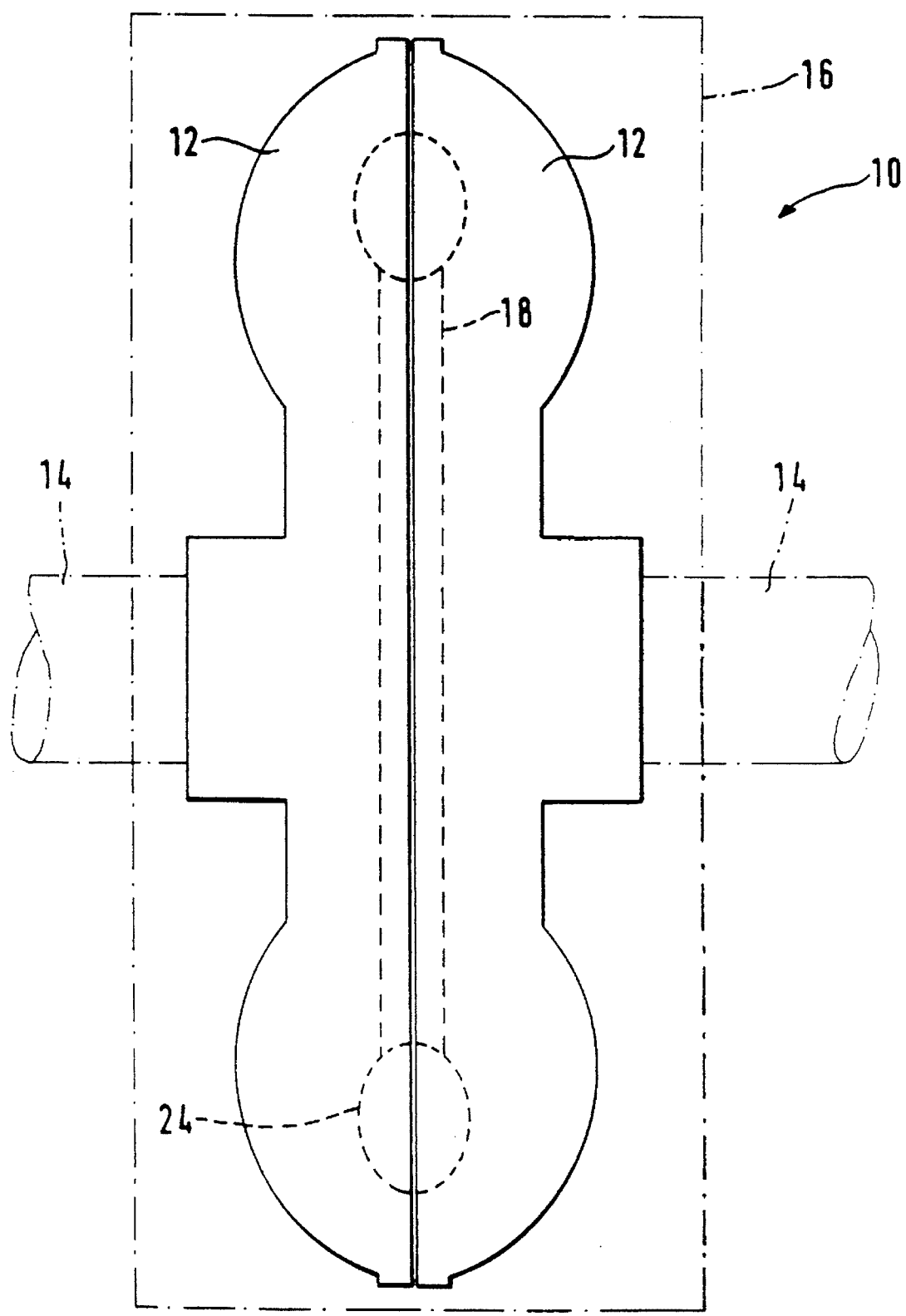
FIG. 1 is a schematic illustration of a Föttinger speed transformer turbine.

Referring to FIG. 1, a Föttinger speed transformer turbine 10 is illustrated. Transformer turbine 10 includes two turbine wheels 12 and two connecting shafts 14 within a housing 16. A stator 18 is schematically illustrated within turbine wheels 12.

Figure 2:
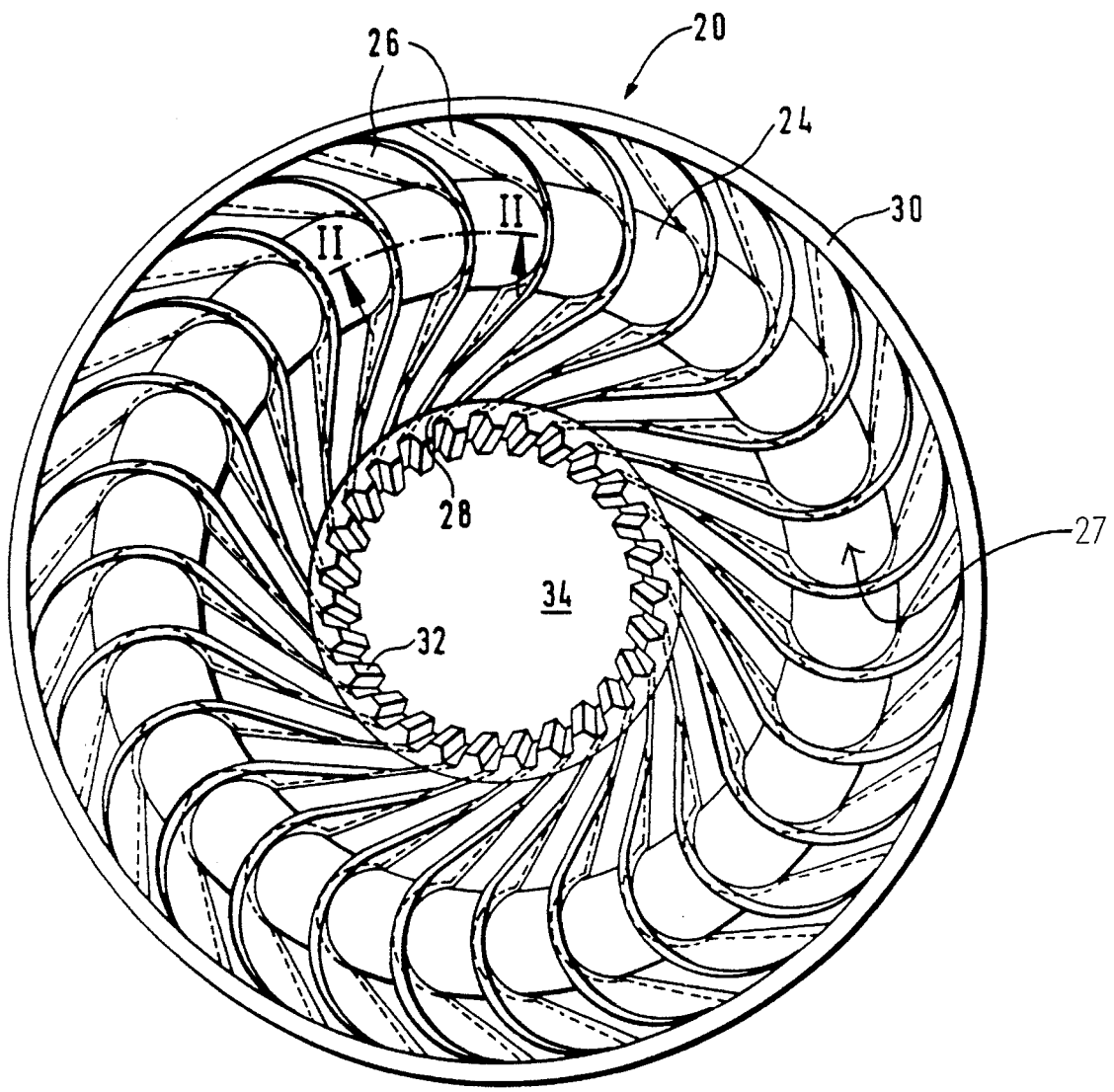
FIG. 2 illustrates a blade insert of a turbine wheel according to the invention.
Figure 2A:
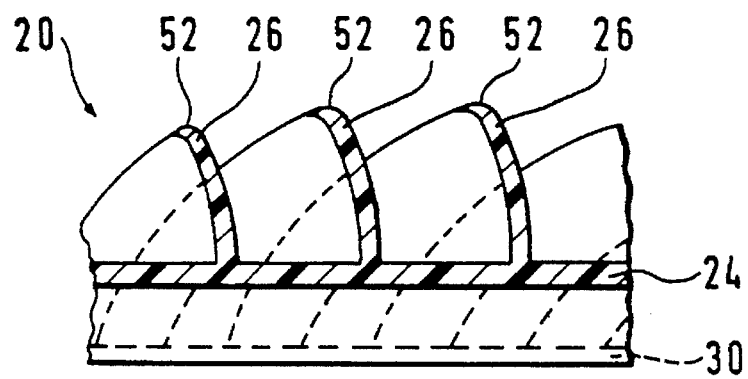
FIG. 2a is a sectional illustration taken along line II—II of FIG. 2.
Figure 3A:
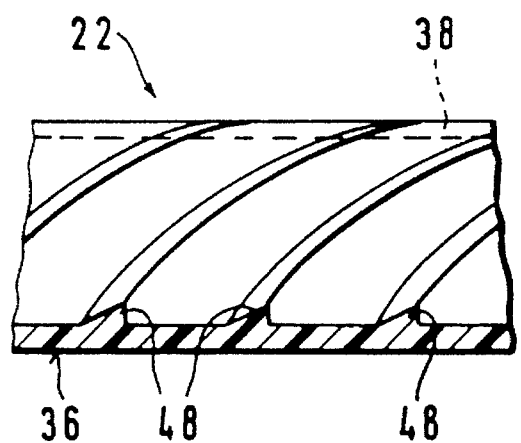
FIG. 3a is a sectional illustration taken along line III—III of FIG. 3.
Figure 3:
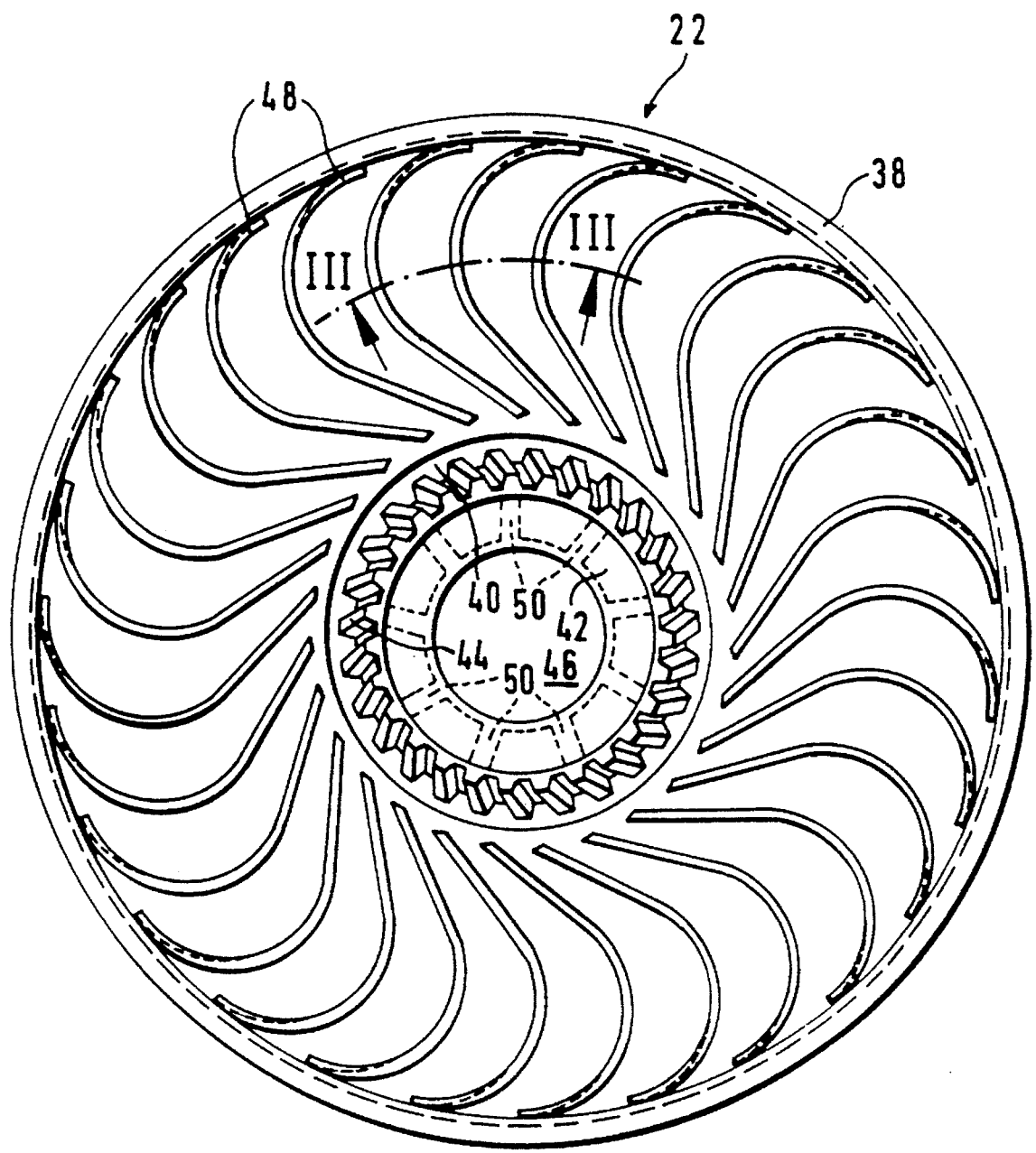
FIG. 3 illustrates an outer shell of the turbine wheel according to the invention.

Referring also to FIGS. 2 and 3, each turbine wheel essentially comprises a blade insert 20, and an outer shell (22).

The blade insert 20 has an inner ring 24, around one side of which blades 26 are arranged. Each adjacent pair of blades 26 has a hollow, undercut portion 27 therebetween. Further, each blade 26 extends from a hub element 28, over inner ring 24 and to an outer ring 30. The blades 26 respectively terminate at an acute angle at hub element 28 and outer ring 30. Outer ring 30 comprises a strip that extends around the outer circumference of blade insert 20.

Hub element 28 includes a plurality of coarse, interior threads 32, together which define an interior break-through 34. Preferably, the number of coarse, interior threads 32 is equal to the number of blades 26 of the blade insert 20.

Figures 4, 5:
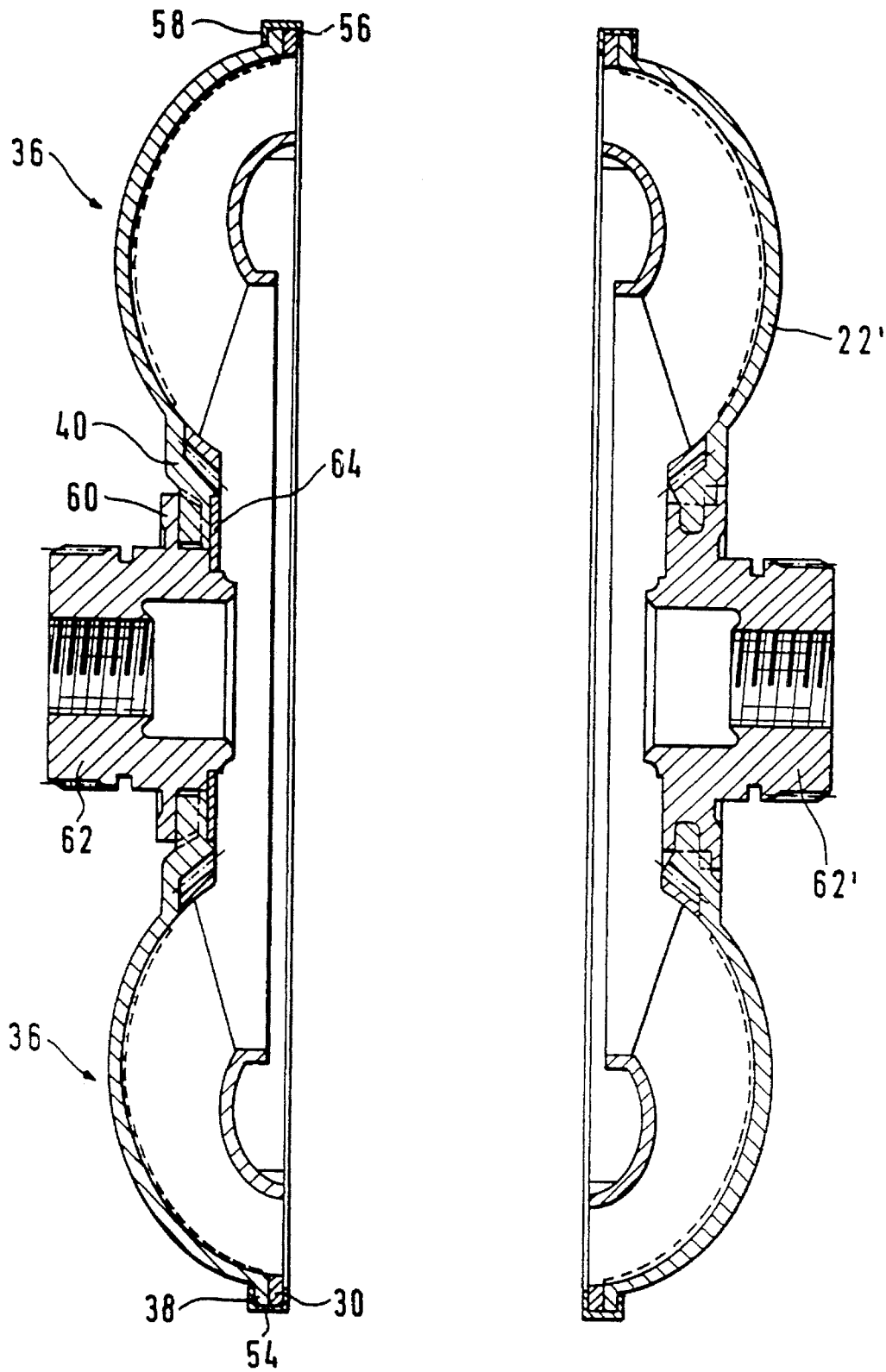
FIG. 4 is a sectional view of an assembled turbine wheel in accordance with a first exemplary embodiment.
FIG. 5 is a sectional view of an assembled turbine wheel in accordance with a second exemplary embodiment.

Referring also to FIG. 4, the outer shell 22 has a torus-shaped profile 36 open on half a side. Outer shell 22 includes a strip-shaped outer ring 38 extending around the outer circumference of the outer shell.

A hub element 40 is formed on an inner circumference of torus-shaped profile 36. Hub element 40 includes a frusto-conical extension 42, on the casing surface of which a plurality of coarse, exterior threads 44 are formed. Frusto-conical extension 42 has a centered passage 46 extending therethrough. Hub element 40 has radially extending recesses 50 which are slightly laterally offset and positioned on a side of the profile 36.

Referring briefly to FIG. 3a, a plurality of projections 48 are located in the interior of torus-shaped profile 36. Projections 48 extend in an arc-shaped pattern over the inside of outer shell 22, and have a triangular cross-sectional shape.

Typically, the main structural elements of the turbine wheel 12, i.e., the blade insert 20 and outer shell 22, are respectively produced by the injection-molding method, and are subsequently assembled to form the turbine wheel 12.

As previously mentioned, blade insert 20 includes an undercut portion 27 between each blade 26. The undercut portions are formed either in the mold cavity, or by ejectors of the injection mold (not illustrated), and require that blade insert 20 be rotated relative to the injection mold when removing the blade insert from the mold cavity. Further, the coarse interior threads 32 also require such a rotating movement when removing the blade insert from the mold. Therefore, according to the invention, both the coarse interior threads 32 and blades 26 advantageously have a pitch which is equal to the rotating removal motion from the mold. Thus, the blade insert 20 can be simply produced using known injection molding techniques.

Preferably, the outer shell 22 is also produced as an injection-molded part, which because of the coarse exterior threads 44, also requires a rotating movement when removing the outer shell from the mold. Projections 48 are formed within the mold cavity, and are thus automatically formed on the inside of outer shell 22.

During assembly, the blade insert 20 is screwed into the interior of the profile 36 with a rotating movement which corresponds to the pitch of the coarse interior and exterior threads 32, 44. The rotating movement continues until the upper edges 52 of blades 26 rest against projections 48, and outer rings 30, 38 lie adjacent to each other.

To fasten outer shell 22 and blade insert 20 together, a sheet metal strip 54 is placed over the outer rings 30, 38 (i.e., around the circumference of outer shell 22 and blade insert 20), and is subsequently bent over at the edges 56 and 58. To complete the assembly, a connecting piece 62 having an annular collar 60 is pushed into the hub element 40 from one side of profile 36, and is fastened on the opposite side of profile 36 using a safety washer 64, which is subsequently bonded to connecting piece 62.

The shape of connecting piece 62 is determined by the installation requirements of the transformer turbine inside a gear. Further, the installation of the connecting piece 62 can take place before, as well as after, the assembly of outer shell 22 and blade insert 20.

During operation of transformer turbine 10, a first and a second turbine wheel 12 (or one pump wheel and one turbine wheel) are located opposite each other. The first turbine wheel is rotationally driven via connecting piece 62. The fluid in the hollow, undercut portions between blades 26 of the first turbine wheel is caused to rotate around the inner ring 24 by the rotating movement. Because of the special shape of blades 26, the second turbine wheel 12 is also caused to rotate. Due to the blade shape, and the shape and pitch of the coarse threads 32, 44, the torque or pulse transfer occurring causes blade insert 20 and/or blades 26 to be forcefully pressed against the inside of outer shell 22. In the process, blades 26 are supported on projections 48, causing each undercut portion to form a sealed chamber. Because of the smooth surface of the injection-molded parts, the fluid can optimally flow in the areas through which it streams.

Thus, the torque being transferred cooperates with the coarse thread to reinforce what would otherwise be a relatively loosely assembled turbine wheel.

Referring to FIG. 5, a second exemplary embodiment is illustrated, in which a connecting piece 62' is injection-molded into the outer shell 22', thus obviating a need to subsequently fasten the connecting piece to the outer shell.

It is possible to provide the outer shell 22 with recesses instead of projections 48, in which blade upper edges 52 come to rest. Further, recesses and projections can be omitted completely, and upper edges 52 instead glued, bonded or otherwise fastened to the outer shell. This may be advantageous when the walls of blades 26 are very thin.

Additionally, inner ring 24 may be omitted, so that blades 26 are directly arranged between outer ring 38 and hub element 40.

The invention now being fully described, it will be apparent to one of ordinary skill in the art that any changes and modifications can be made thereto without departing from the spirit or scope of the invention as set forth herein.

What is claimed is:

1. A turbine wheel for a hydrodynamic transformer, comprising:

an injection molded outer shell having one of a plurality of projections and recesses; and an integrally formed injection molded blade insert received within said injection molded outer shell and including a plurality of blades supported by said one of a plurality of projections and recesses, and at least one of an inner ring and a hub element.

2. A turbine wheel as defined in claim 1, wherein said blades are bonded to said outer shell.

3. A turbine wheel as defined in claim 1, wherein said blade insert includes said inner ring and said hub element, said hub element having said blades extending therefrom.

4. A turbine wheel as defined in claim 1, further comprising a connecting piece, said outer shell including a hub element for receiving said connecting piece.

5. A turbine wheel as defined in claim 1, wherein said blade insert includes an annular outer ring for connecting an outer edge of said blades together.

6. A turbine wheel as defined in claim 1, wherein said blade insert and said outer shell each have an outer circumference; further comprising a sheet metal connecting strip for enclosing each said outer circumference to connect said blade insert and said outer shell together.

7. A turbine wheel as defined in claim 1, wherein said blade insert and said outer shell comprise one of a thermoplastic and thermosetting material.

8. A turbine wheel for a hydrodynamic transformer, comprising:

an injection molded outer shell having a hub element;

an integrally formed injection molded blade insert including a plurality of blades and at least one of an inner ring and a hub element, said injection molded blade insert being received within said injection molded outer shell; and a connecting piece received by and enclosed by said outer shell hub element.

9. A turbine wheel as defined in claim 8, wherein said blades are bonded to said outer shell.

10. A turbine wheel as defined in claim 8, wherein said outer shell includes one of a plurality of projections and recesses for supporting said blades.

11. A turbine wheel as defined in claim 8, wherein said blade insert includes said inner ring and said blade insert hub element, said blade insert hub element having said blades extending therefrom.

12. A turbine wheel as defined in claim 8, wherein said blade insert includes an annular outer ring for connecting an outer edge of said blades together.

13. A turbine wheel for a hydrodynamic transformer, comprising:

an injection molded outer shell having a hub element;

an integrally formed injection molded blade insert including a plurality of blades and a hub element, said injection molded blade insert being received within said injection molded outer shell, said blade insert hub element and said outer shell hub element each including corresponding threads for screwably connecting said blade insert to said outer shell, the connection being tightened by a force acting on said blades during operation of the transformer; and a connecting piece received by said outer shell hub element.

14. A turbine wheel as defined in claim 13, wherein said outer shell hub element thread comprises a coarse exterior thread, and said blade insert hub element comprises a coarse interior thread.

15. A turbine wheel as defined in claim 13, wherein said blades are bonded to said outer shell.

16. A turbine wheel as defined in claim 13, wherein said outer shell includes one of a plurality of projections and recesses for supporting said blades.

17. A turbine wheel as defined in claim 13, wherein said blade insert includes said inner ring and said blade insert hub element, said blade insert hub element having said blades extending therefrom.

18. A turbine wheel as defined in claim 13, wherein said blade insert includes an annular outer ring for connecting an outer edge of said blades together.

19. A turbine wheel for a hydrodynamic transformer, comprising:

an die-cast outer shell including one of a plurality of projections and recesses; and an integrally formed die-cast blade insert including a plurality of blades supported by said one of a plurality of projections and recesses, and at least one of an inner ring and a hub element, said die-cast blade insert being received within said die-cast outer shell, said blade insert and said outer shell comprising a metal.

20. A turbine wheel as defined in claim 19, wherein said metal comprises aluminum.

* * * * *